United States Patent
Andrzejewski

(10) Patent No.: US 10,549,842 B2
(45) Date of Patent: Feb. 4, 2020

(54) PROPELLER BLADES

(71) Applicant: Ratier-Figeac SAS, Figeac (FR)

(72) Inventor: Arnaud Andrzejewski, Lissac et Mouret (FR)

(73) Assignee: RATIER-FIGEAC SAS (FR)

( * ) Notice: Subject to any disclaimer, the term of this patent is extended or adjusted under 35 U.S.C. 154(b) by 304 days.

(21) Appl. No.: 15/621,438

(22) Filed: Jun. 13, 2017

(65) Prior Publication Data

US 2017/0355446 A1 Dec. 14, 2017

(30) Foreign Application Priority Data

Jun. 14, 2016 (EP) .................................. 16305723

(51) Int. Cl.
*B64C 11/26* (2006.01)
*F01D 5/30* (2006.01)
*B29D 99/00* (2010.01)
*C23C 4/06* (2016.01)
*C23C 4/129* (2016.01)
*B29C 70/86* (2006.01)

(52) U.S. Cl.
CPC .......... *B64C 11/26* (2013.01); *B29D 99/0025* (2013.01); *C23C 4/06* (2013.01); *C23C 4/129* (2016.01); *F01D 5/3069* (2013.01); *B29C 70/865* (2013.01)

(58) Field of Classification Search
CPC ....... B64C 11/26; B64C 11/06; B64C 11/205; B29D 99/0025; C23C 4/06; F01D 5/288
See application file for complete search history.

(56) References Cited

U.S. PATENT DOCUMENTS

| | | | |
|---|---|---|---|
| 2,146,342 A | 2/1939 | Koyemann et al. | |
| 5,222,297 A | 6/1993 | Graff et al. | |
| 6,425,745 B1 * | 7/2002 | Lavin | C23C 4/12 118/321 |
| 6,443,701 B1 * | 9/2002 | Muhlbauer | B64C 11/06 416/230 |
| 6,676,080 B2 | 1/2004 | Violette | |
| 8,753,088 B2 | 6/2014 | Pfeiffer et al. | |
| 8,801,383 B2 | 8/2014 | Soule et al. | |
| 9,273,400 B2 * | 3/2016 | Nardi | C23C 4/02 |
| 9,404,172 B2 * | 8/2016 | Clavette | B64C 11/205 |
| 9,809,299 B2 * | 11/2017 | Udall | B64C 11/04 |

(Continued)

FOREIGN PATENT DOCUMENTS

| EP | 1852520 | 11/2007 |
|---|---|---|
| EP | 2572979 | 3/2013 |

(Continued)

OTHER PUBLICATIONS

WC 12CO Tungsten Carbide Powder. Datasheet [online]. Polymet, Sep. 2015 [retrieved on Jun. 4, 2019]. Retrieved from the Internet. (Year: 2015).*

(Continued)

*Primary Examiner* — Dwayne J White
*Assistant Examiner* — Jackson N Gillenwaters
(74) *Attorney, Agent, or Firm* — Cantor Colburn LLP

(57) ABSTRACT

A propeller blade comprises a fibre reinforced blade structure spar having a blade retention section formed at one end thereof, and at least one metallic formation spray deposited onto said blade retention section.

16 Claims, 3 Drawing Sheets

(56) References Cited

U.S. PATENT DOCUMENTS

| | | | | |
|---|---|---|---|---|
| 2005/0014010 A1* | 1/2005 | Dumm | ............... | C09K 3/1445 |
| | | | | 428/472 |
| 2010/0279148 A1* | 11/2010 | Hu | ................... | B23K 35/3033 |
| | | | | 428/680 |
| 2014/0193271 A1 | 7/2014 | Dudon et al. | | |
| 2015/0110633 A1 | 4/2015 | Nagle et al. | | |

FOREIGN PATENT DOCUMENTS

| | | |
|---|---|---|
| EP | 2631323 | 8/2013 |
| EP | 2853566 | 4/2015 |

OTHER PUBLICATIONS

"Replacement of Chromium Electroplating on Helicopter Dynamic Components Using HVOF Thermal Spray Technology", ESTCP Cost and Performance Report (WP-0127), Nov. 1, 2009, ESTCP Program Office, Arlington, VA, Retrieved from the internet: http://www.dtic.mil/dtic/tr/fulltext/u2/a520680.pdf [retrieved on May 6, 2013]; 47 pages.

European Search Report, European Application No. 16305723.5, dated Dec. 21, 2016, European Patent Office; European Search Report 8 pages.

\* cited by examiner

PROPELLER BLADES

FOREIGN PRIORITY

This application claims the benefit of European Application No. 16305723.5 filed Jun. 14, 2016, which is incorporated herein by reference in its entirety.

TECHNICAL FIELD

The present disclosure relates to propeller blades and methods for making propeller blades.

BACKGROUND

Propeller blades are typically formed from a structural spar which is attached at one end to a retention element. The retention element retains the blade in a hub of the propeller and is generally made from metal such as steel. It may comprise various features such as bearing races which will allow the pitch of the blade to be varied during operation. Examples of such propeller blades are disclosed in U.S. Pat. No. 5,222,297 A and US 2015/0110633 A1.

The spar is typically a fibre reinforced structure comprising a lightweight core, for example a cellular structure such as foam, which is surrounded by multiple layers of fibre reinforcement.

The spar is typically formed by attaching, for example bonding, the core to the retention element and then wrapping layers of fibre reinforcement around the core. Leading and trailing edge structures, for example foam structures, may be bonded or otherwise attached to the spar to create the blade profile, a woven fabric then wrapped around the structure, and the whole structure then impregnating with resin and cured to form the final blade assembly.

Whilst such constructions and manufacturing techniques are satisfactory, the metallic retention element may be relatively heavy and expensive to produce. Also, should any problem arise in the manufacturing process, then the whole assembly including the retention element will potentially need to be scrapped, which is costly.

SUMMARY

From a first aspect, this disclosure provides a propeller blade comprising a fibre reinforced blade structure having a blade retention section formed at one end thereof, and at least one metallic formation spray deposited onto said blade retention section.

The metallic formation may for example be a bearing race or a seal carrier.

The metallic formation may have a hardness of greater than 45 Rc, for example greater than 55 Rc.

The metallic formation may be made from a Tungsten-Cobalt carbide alloy.

A primer layer may be provided intermediate the blade retention section and the metallic formation.

The primer layer may be of Aluminium or Zinc.

The retention section may further comprise a profile or texture for mechanically interlocking the formation to the retention section.

The disclosure also provides a method of manufacturing a propeller blade comprising the steps of: providing a fibre reinforced blade structure comprising a retention section formed at one end thereof; and depositing at least one metallic formation on the retention section by a thermal spraying technique.

The metallic formation may be deposited using an HVOF (high velocity oxy-fuel) or HP-HVOF (high pressure, high velocity oxy-fuel) spraying process.

The metallic formation may extend around the circumference of the retention portion, the formation being deposited by relative rotation of the retention portion and a spray deposition device.

The metallic formation may be made from a Tungsten-Cobalt carbide alloy.

The metallic formation may be a bearing race or a seal carrier.

The method may further comprise depositing a primer layer on the fibre reinforced spar prior to deposition of the metallic formation.

The primer layer may be deposited using a thermal spraying process, for example a flame spraying process.

The primer layer may be machined prior to deposition of the metallic formation.

The primer layer may be Aluminium or Zinc.

The method may further comprise machining the metallic formation after its deposition.

The disclosure also provides a method of refurbishing a propeller blade in accordance with the disclosure in which the metallic formation has become damaged or worn. The method comprises depositing a new metallic formation on the blade retention section using a thermal spraying technique.

The damaged or worn formation may be partially or fully removed prior to deposition of the new formation.

The blade retention section and/or any residual original metallic formation may be treated prior to deposition of the new formation, for example by application of a primer as discussed above.

BRIEF DESCRIPTION OF DRAWINGS

Some embodiments of the disclosure will now be described by way of example only and with reference to the accompanying drawings in which.

DETAILED DESCRIPTION

Figure 1:
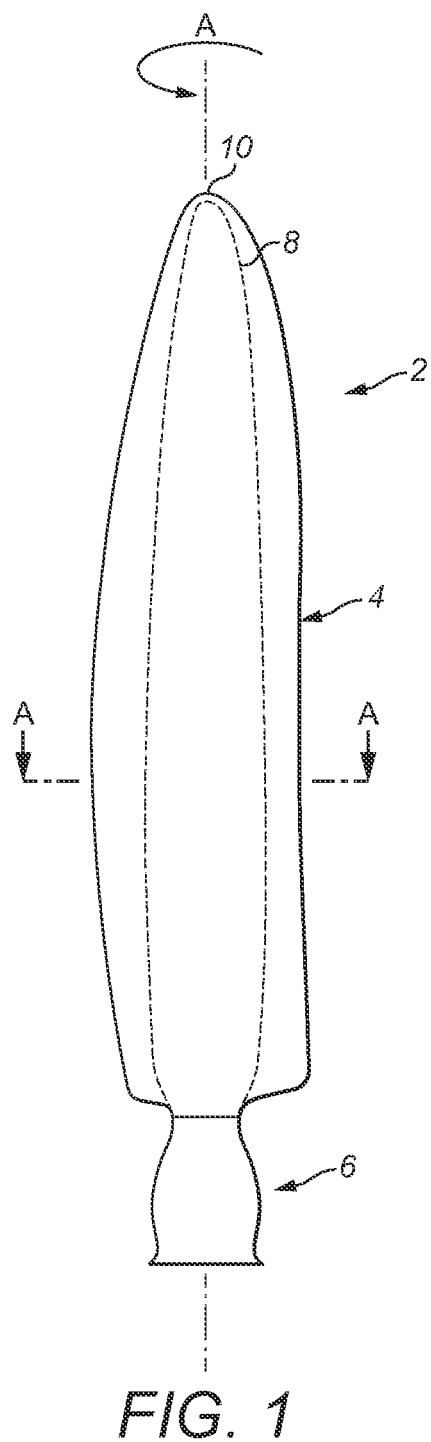
FIG. 1 shows, generally, a propeller blade in accordance with this disclosure.

With reference to FIG. 1, an exemplary propeller blade 2 is illustrated.

The propeller blade 2 comprises an airfoil portion 4 and a blade retention section 6. The blade 2 further comprises a fibre reinforced structure 8, for example a structural spar 8, which extends along the length of the blade 2 substantially from the retention section 6 to the blade tip 10. As can be seen from FIG. 2, in this embodiment, the structural spar 8 comprises a plurality of layers 12 of resin impregnated fibres. The spar 8 may further comprise a lightweight cellular core structure 14 such as foam, around which the layers 10 are wrapped.

The blade 12 further comprises a leading edge insert 16 and a trailing edge insert 18. These may, for example be formed of a lightweight cellular material such as foam. The spar 8, leading edge insert 16 and trailing edge insert 18 may be surrounded by one or resin impregnated layers or socks 20, for example of a braided construction. The layers or socks 20 form the outer surface of the airfoil portion 4 of the blade 2. Other elements such as erosion resistant coatings or sheaths may be provided on the blade if required. It will be appreciated that this is just one form of blade construction and that other forms of fibre reinforced composite blade construction may benefit from this disclosure. For example, the blade 2 may or may not have a foam core 14. Also, the layers 12 of the structure 8 and the socks 20 may be dry or resin impregnated, as an example.

Figure 2:
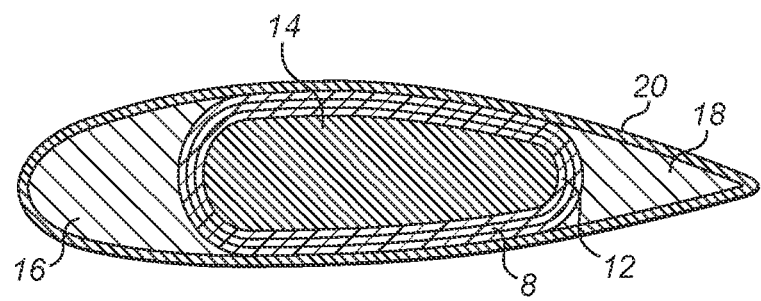
FIG. 2 shows a schematic horizontal cross section through the blade of FIG. 1.

As described so far, the blade 2 is conventional. In prior art blades, as described in the Summary above, the structural spar 8 is attached to a metallic retention element. However, in accordance with this disclosure, a different approach is adopted as illustrated in FIGS. 2, 3 and 4.

Figure 3:
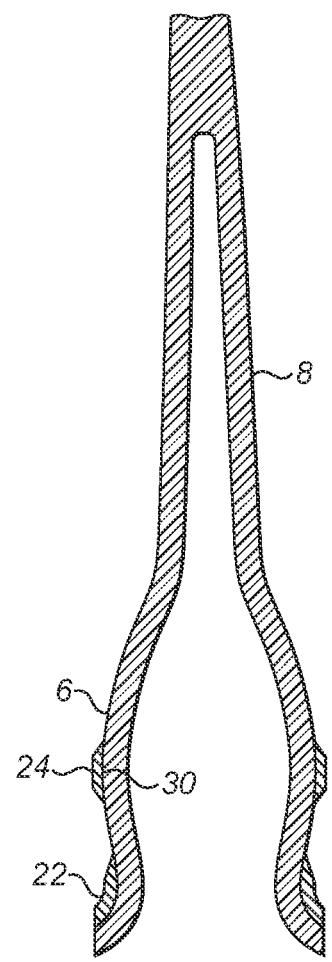
FIG. 3 shows a schematic cross sectional view of a section of the fibre reinforced structure of the propeller blade of FIG. 1.
Figure 4:
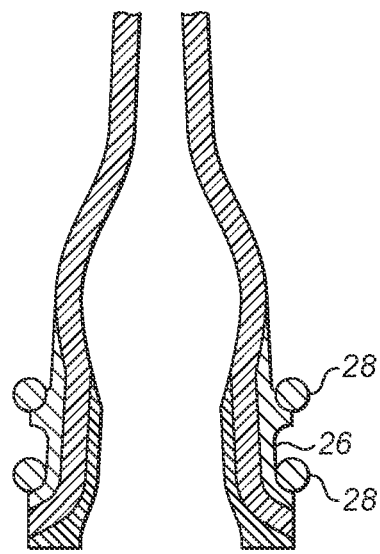
FIG. 4 shows a schematic cross sectional view of an alternative fibre reinforced structure in accordance with the disclosure.

With reference to FIG. 3, the fibre reinforced blade structure 8 is extended below the airfoil portion 4 of the blade 2 and forms the retention section 6 of the blade 2 at one end thereof. There is no separate metallic retention element. However, it may still be desirable to provide certain metallic formations in the retention section 6. For example, propeller blades 2 are usually mounted in a propeller hub (not shown) in a manner so as to allow the pitch of the blade to be varied by rotating the blade 2 about a vertical axis A (see FIG. 1). To facilitate this, one or more bearing races may be provided on the retention section 6 of the propeller blade 2. Also, one or more seal carriers may be provided on the retention section. In prior art constructions such formations would have been formed in, for example machined into, the metallic retention element or been mounted thereto as separate bearing races. However, in accordance in with this disclosure, the formations are created by spray deposition onto the retention section 6 of the fibre reinforced blade structure 8.

In the embodiment of FIG. 3, formations 22, 24 are deposited onto appropriate parts of the retention section 6. Thus in this embodiment, formations 22, 24 may be deposited separately onto the retention section 6. Such an arrangement may be advantageous in that it may permit different materials to be deposited. Thus in certain embodiments, the materials of the formations 22, 24 may be optimised for their intended functions. Of course in other embodiments, the formations 22, 24 may be of the same material.

In the embodiment of FIG. 3, the formations 22, 24 may be a bearing race 22 and a seal carrier 24 for example. These may be annular formations extending around the entire circumference of the retention portion 6. Other formations may be provided as appropriate or necessary, for example as fastening area for electrical terminal blocks, sensors, targets etc . . .

In the embodiment of FIG. 4, a double bearing race 26 is illustrated. Here two bearing tracks 28 are provided on a common formation 26 rather than on two separate formations.

The formations may be made of a metallic material suited to their particular purpose. For example, a bearing race 22 or other formation subject to high loads and wear may be made from a relatively hard and wear resistant material for example a Tungsten-Cobalt carbide alloy. The formation may have a hardness of greater than 45 Rc, for example. For example, a seal carrier formation may require a hardness of greater than 45 Rc and a bearing race a higher hardness for example greater than 55 Rc. Other formations, subject to lesser loads and wear, may be made from less hard materials.

Turning now to an exemplary process for manufacturing the blade 2, the fibre reinforced blade structure 8 is constructed first. Layers of fibre reinforcement 12 may be wrapped around a suitable former, for example a cellular core 14, impregnated with a suitable resin (or be pre-impregnated with a resin) and the blade structure 8 then cured in a conventional manner.

As discussed above, the reinforced blade structure 8 forms a retention portion 6 of the blade 2. Metallic formations 22, 24 are then deposited on the retention portion 6 by a thermal spraying process.

Thermal spraying is a deposition process in which a melted or heated material is sprayed onto a surface. The material solidifies on the surface and repeated deposition can build up a layer of a desired thickness.

A wide variety of thermal spraying techniques are known. Examples of such techniques include plasma spraying, detonation spraying, flame spraying, high velocity oxy-fuel (HVOF) spraying, HP-HVOF (high pressure, high velocity oxy-fuel) spraying, warm spraying and cold spraying. The particular process chosen will depend on the nature of the material being deposited, the finish required and the desired coating thickness.

In certain embodiments of this disclosure, it is believed that HVOF and HP-HVOF may be advantageous deposition processes. These processes allow the deposition of relatively thick layers, for example up to 12 mm in thickness. They are also frequently used to deposit wear and corrosion resistant coatings on materials. This may be particularly advantageous in the deposition of bearing races where, as discussed above, the bearing race should have good wear resistance. Also, they may produce a firm bond with the underlying substrate and produce consistent coating characteristics throughout the formation thickness. HVOF and HP-HVOF spraying equipment is available from a wide range of suppliers, for example Praxair.

A variety of materials may be deposited. HVOF or HP-HVOF may be used to deposit materials such as WC—Co, corrosion-resistant alloys such as stainless steels, nickel-based alloys, aluminium, Tungsten-Chrome-Titanium carbide alloy, Tungsten carbide-cobalt alloy, Tungsten carbide -Chrome alloy, Tungsten carbide-Ni—Cr alloy and chrome carbide alloy. These materials may have a hardness of greater than 45 Rc, or 55 Rc making them particularly suitable for seal carriers and bearing races for example.

In certain embodiments, the formations 22, 24 may be deposited by relative rotation of the blade structure 8 and a thermal spraying apparatus, the formation being built up to an appropriate depth over multiple rotations. The relative rotation may be achieved either by rotating the blade structure 8 relative to a spraying head or rotating a spraying head relative to the blade structure 8.

In order to improve adhesion of the formations 22, 24 to the retention portion 6, a layer 30 of primer may be applied to the retention portion 6 prior to deposition of the formations 22, 24.

In certain embodiments, the primer may be another metallic material such as Aluminium or Zinc. The primer layer 30 may be deposited by any suitable process, but again a thermal spraying process, for example a flame spraying process, may be used.

In certain embodiments, the primer layer 30 may be machined after its deposition on the retention portion and before deposition of the formations 22, 24.

Figure 5:
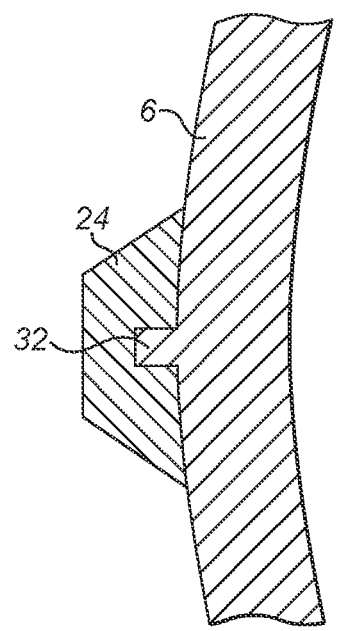
FIG. 5 shows a schematic cross sectional view of a detail of a further fibre reinforced structure in accordance with the disclosure.

To improve adhesion of the formations 22, 24 to the retention section 6, the retention section 6 may be provided with a surface profile or texture for mechanically interlocking the formations 22, 24 to the retention section 6. For example, the retention section 6 may be provided with one or more keying elements such as grooves, recesses, dimples, flanges, ribs, protrusions or the like, or a surface texture in the region where the formations 22, 24 are to be deposited. The formations 22, 24 may therefore be keyed mechanically to the surface as well as being bonded due to the deposition process. FIG. 5 illustrates, schematically, such an embodiment in which a keying element 32 in the form of circumferentially extending flange or rib is provided on the retention portion 6 for interlocking with the formation 24. The keying elements 32 may, for example, extend axially or circumferentially.

After the formations 22, 24 have been deposited, they may be finished, for example by machining, to a final shape.

The leading and trailing edge inserts 16, 18 and the sock(s) 20 may then be assembled to the spar 8, the sock(s) 20 impregnated with resin (or be pre-impregnated socks) and the blade 2 then cured.

Alternative sequences can be chosen depending on the blade structure 8 and blade assembly process. In one alternative process, the blade structure 8 may be laid up on the cellular core 14, the leading and trailing edge inserts 16, 18 the layers of fabric or sock(s) 20 assembled, and the assembly impregnated with resin and cured. The deposition of the metal formations 22, 24 would then take place after the curing. What is important, however, is that the metal formations 22, 24 are only deposited onto the blade structure 8 after curing.

It is believed that the embodiments of the disclosure described may have certain advantages over prior constructions. Firstly, the weight of the blade 2 may be reduced as only selected parts of, rather than the whole, retention section 6 are now made from a metallic material. This also leads to a potential reduction in cost as there is no need to source and pre-machine metallic retention sections. In addition, in prior constructions, as the metallic retention section was attached to the spar at the beginning of the blade manufacturing process, any errors which occurred during the blade formation process could result in the scrappage of the entire assembly including the retention section. Adding the formations only after the blade structure 8 has been constructed, as in the embodiments described above, means that any errors in the spar construction will not result in scrappage of a costly metallic retention portion.

In addition, the deposited formations 22, 24, 26 may be more corrosion resistant than traditional metallic retention sections.

Also, blades in accordance with the disclosure may be refurbished in service using the same processes as discussed above. Formations, for example bearing races may be become damaged or worn in use and rather than replace the whole blade, the formations may be repaired or replaced using the above techniques.

In an exemplary process, therefore, a damaged or worn formation 22, 24, 26 may be at least partially removed and a new formation applied on the retention section 6 by any of the thermal spraying processes discussed above.

The retention section 6 and any residual original formation 22, 24, 26 may be treated in any appropriate manner, for example, with a primer as discussed above, in preparation for the deposition of the new formation 22, 24, 26.

It will be understood that the description above is of exemplary embodiments of the invention only and that modifications may be made thereto without departing from the scope of the disclosure.

The invention claimed is:

1. A propeller blade comprising a fibre reinforced structure having a blade retention section formed at one end thereof, and at least one metallic formation spray deposited onto said blade retention section, wherein said metallic formation is a bearing race or a seal carrier.

2. A propeller blade as claimed in claim 1, wherein said metallic formation has a hardness of greater than 45 Rc.

3. A propeller blade as claimed in claim 1, wherein said metallic formation is made from a Tungsten-Cobalt carbide alloy.

4. A propeller blade as claimed in claim 1, comprising a primer layer intermediate said blade retention section and said metallic formation.

5. A propeller blade as claimed in claim 1, wherein the retention section comprises a profile or texture for mechanically interlocking the formation to the retention section.

6. A method of manufacturing a propeller blade comprising the steps of: providing a fibre reinforced blade structure comprising a retention section formed at one end thereof; and depositing at least one metallic formation on said retention section by a thermal spraying technique, wherein said metallic formation is a bearing race or a seal carrier.

7. A method of manufacturing a propeller blade as claimed in claim 6, wherein said metallic formation is deposited using an HVOF or HP-HVOF process.

8. A method of manufacturing a propeller blade as claimed in claim 6, wherein said metallic formation extends around the circumference of the retention portion, the formation being deposited by relative rotation of the retention portion and a spray deposition device.

9. A method of manufacturing a propeller blade as claimed in claim 6, wherein said metallic formation is made from a Tungsten-Cobalt carbide alloy.

10. A method of manufacturing a propeller blade as claimed in claim 6, further comprising depositing a primer layer on the retention section prior to deposition of the metallic formation, the primer layer optionally being machined prior to deposition of the metallic formation.

11. A method of manufacturing a propeller blade as claimed in claim 10, wherein said primer layer is deposited using a flame spraying process.

12. A method of manufacturing a propeller blade as claimed in claim 6, further comprising machining the metallic formation after its deposition.

13. A method of refurbishing a propeller blade comprising a fibre reinforced structure having a blade retention section formed at one end thereof, and at least one metallic formation spray deposited onto said blade retention section, wherein when the metallic formation has become damaged or worn, the method comprising depositing a new or replacement metallic formation on the blade retention section using a thermal spraying technique, the metallic formation and the new or replacement metallic formation is a bearing race or a seal carrier.

14. A propeller blade as claimed in claim 1, wherein the metallic formation is mechanically keyed to the blade retention section.

15. A propeller blade as claimed in claim 1, wherein said metallic formation has a hardness of 55 Rc.

16. A propeller blade as claimed in claim 4, wherein said primer layer is one of Aluminum or Zinc.

\* \* \* \* \*